(12) United States Patent
Altmeier et al.

(10) Patent No.: US 6,488,826 B2
(45) Date of Patent: Dec. 3, 2002

(54) FLUID ELECTRODE SYSTEM FOR RESISTIVE SLOPE SENSORS

(76) Inventors: Patrick Altmeier, Donatusstrasse 43, 66822 Lebach (DE); Andreas Konrad, Mühlgasse 2, 66440 Blieskastel-Mimbach (DE)

( * ) Notice: Subject to any disclaimer, the term of this patent is extended or adjusted under 35 U.S.C. 154(b) by 0 days.

(21) Appl. No.: 09/950,403

(22) Filed: Sep. 10, 2001

(65) Prior Publication Data

US 2002/0020624 A1 Feb. 21, 2002

Related U.S. Application Data

(62) Division of application No. 09/328,721, filed as application No. PCT/DE97/02856 on Dec. 8, 1997.

(30) Foreign Application Priority Data

Dec. 9, 1996 (DE) .......................... 196 50 977

(51) Int. Cl.$^7$ ................................ G01N 27/26
(52) U.S. Cl. ............... 204/400; 205/775; 200/190; 200/193; 200/194; 116/109; 116/227; 324/439; 340/620; 422/82.02
(58) Field of Search .............. 204/400; 205/775; 200/190, 193, 194; 422/82.01, 82.02; 324/439, 446; 116/109, 227; 340/618, 620

(56) References Cited

U.S. PATENT DOCUMENTS

| 2,387,313 | A |   | 10/1945 | Wilson |
| 2,852,646 | A |   | 9/1958  | Broadley |
| 2,927,987 | A |   | 3/1960  | Uhl |
| 3,098,813 | A | * | 7/1963  | Beebe et al. |
| 3,129,161 | A | * | 4/1964  | Anderson et al. |
| 3,291,705 | A | * | 12/1966 | Hersch |
| 3,592,750 | A | * | 7/1971  | Lee |
| 3,751,296 | A | * | 8/1973  | Beer |
| 3,761,385 | A | * | 9/1973  | Ruthel et al. |
| 4,166,021 | A | * | 8/1979  | Ross et al. |
| 4,169,779 | A | * | 10/1979 | Tataria et al. |
| 4,522,690 | A | * | 6/1985  | Venkatasetty |

FOREIGN PATENT DOCUMENTS

| DE | 19507610    | 9/1996  |
| DE | 19512374    | 10/1996 |
| FR | A-2668824   | 5/1992  |
| WO | WO 96/27892 | 9/1996  |

* cited by examiner

Primary Examiner—T. Tung
(74) Attorney, Agent, or Firm—Henry M. Feiereisen; Ursula B. Day

(57) ABSTRACT

An electrode electrolyte system is provided that is capable of operating in slope sensors in a wide range of temperatures. The eletrolytic system is characterized by a stable conductivity at high temperature and by low toxicity. The slope sensor can be installed in a system containing an NaI solution in propylene carbonate, combined with platinum electrodes.

5 Claims, No Drawings

FLUID ELECTRODE SYSTEM FOR RESISTIVE SLOPE SENSORS

CROSS-REFERENCES TO RELATED APPLICATIONS

This application is a division of prior filed copending patent application, Appl. Ser. No. 09/328,721, filed Jun. 9, 1999, which is a continuation of prior filed copending PCT International application no. PCT/DE97/02856, filed Dec. 8, 1997, which claims the priority of German Patent Application Ser. No. 196 50 977.7, filed Dec. 9, 1996, the subject matter of which is incorporated herein by reference.

BACKGROUND OF THE INVENTION

The present invention relates to new fluid electrode system and in particular a fluid electrode system for use in resistive slope sensors. This fluid electrode system consists of a mixture of an electrolyte and a solvent, and due to its favorable properties, permits a wide variety of technical applications.

DESCRIPTION OF THE PRIOR ART

A resistive slope sensor, in particular one for the automotive area, is described in DE 19512374 as having a housing which is partially filled with an electrically conducting fluid. The housing contains electrodes for recording measuring signals which are conducted through the housing wall to the outside, where the measuring signals are fed to a plotting unit. That invention proposes that polyether be used as a fluid to serve the function of a sensor. However, because of the toxicity of the proposed materials, their mass application may be fraught with problems.

FR-A2668824 describes fluid-filled sensors, containing as sensor fluid, mixtures based on ethylene glycol and water in equal parts. As the lower working limit for these sensors, the temperature is given as −31° C., thus, also ruling out these sensors as a possible solution, since the automotive area requires a working temperature range of <−40 to 120° C., as well as a flash point >100° C.

Furthermore, WO 96/27892 and DE 19507610 describe fluids which contain as a main component, at least triethyleneglycodimethylether, a compound having mono- or multi OH-functional groups, and a salt which is dissociated within the mixture. Further mixtures that are suitable as electrolytes are described in U.S. Pat. No. 2,852,646, U.S. Pat. No. 2,387,313 and in U.S. Pat. No. 2,927,987.

The sensor fluid described in DE 19597610 represents the best solution to the problem as stated for that sensor and is based on the marginal conditions for its application described in DE 19512374.

However, the disadvantages of that particular sensor fluid are, possible health hazards effected through triethyleneglycodimethylether (see in connection therewith: RTCS No.: XF0665000 2,5,8,1,1-tetraoxadodecane); a likely formation of peroxide when coming in contact with oxygen, and the difficulty of handling the fluids based on the strongly hygroscopic behavior they exhibit, in conjunction with undesirable changes of the electrical properties that occur with the uptake of water, which makes use of these sensors undesirable.

SUMMARY OF THE INVENTION

It is thus an object of the present invention to provide an improved sensor fluid-electrode system, obviating the aforestated drawbacks. In particular, it is the object of the present invention to provide an improved sensor fluid-electrode system for use as a slope sensor which fulfills the marginal conditions as described above and which, at the same time, lacks the problems such as, toxicity, incompatibility with water and formation of peroxide.

Furthermore, the electrode-fluid-system must be able to solve the following technical marginal conditions:

working temperature range −40 to +85° C.

ratio of conducting capacity at the working temperature end points "Factor F"

max. 22; computation: (conducting capacity +85° C./conducting capacity −40° C.)

lowest possible changes in viscosity and level of conductivity though thermal alteration no discharge at the electrodes.

In a fundamental solution to the object of the present invention namely, to provide the type of fluid component without the above described disadvantages it has been found that mixing an electrolyte with a solvent provides such an improved fluid-electrode system. Additional components, such as solvent facilitators, stabilizers etc. may also be introduced into the system. Furthermore, the sensor fluid can be made compatible with a particular electrode system of choice.

These objects, and others which will become apparent hereinafter, are attained in accordance with the present invention as further described.

DESCRIPTION OF THE INVENTION

At the outset, the selection of propylene carbonate as a solvent for a fluid component, as described in WO 96127892, is not considered a solution to the object of the invention, since propylene-based electrolytes do exhibit a comparatively large changes in conductivity relative to temperature (compare Example 1). Other fluid components listed there, are conditioned to a lesser degree on the conductivity changes relative to the temperature.

However, the addition of water to the sensor fluids, in particular, the triethyleneglycol dimethylether-based sensor fluids, causes a dramatic decrease in the conductivity condition, thus requiring water-free conditions for the production of the slope sensor, its application, and throughout the life of the slope sensor. Water free conditions poses high demands on the production effort of the slope senor, and in particular also on sealing of the housing, as described in DE-195 12374, since electrodes must be conducted through the housing and the conduits must be sealed. These adverse properties of the fluid systems are amplified further by the hygroscopic characteristics of the triethyleneglycol dimethylether.

It has surprisingly been found, that when propylene carbonate is used as a sensor fluid base, the addition of water causes only small changes in the conductivity condition between the outer limits of the temperature range as is shown in Example 1. This is surprising, since addition of water to various other organic solvents always leads to considerable changes of this condition. Propylene carbonate thus appears to mask available charge carriers (ions) at high temperatures for water.

Advantageously, it follows, that by using propylene carbonate as a solvent base of the fluid component according to the invention, the electrochemical properties, particularly the conductivity-temperature range condition, are very insensitive to contamination by water.

It appears, that a mixture of tetra-alkylammonium halogenides and propylene carbonate solves this object of the invention. These compounds are soluble within the temperature range from −45 to >+100° C. in propylene carbonate. These solutions exhibit electrical conductivity. For example, a 0.055% solution exhibits at −40° C., a conductivity of 12.5 $\mu$S cm$^{-1}$, at 85° C., a conductivity of 260 $\mu$S cm$^{-1}$. By varying the amount of tetraethylammonium halogenides to be used, conductivity may be adjusted within a wide range of requirements without extensive change of factor F.

To provide a complete solution to the object of the invention, a sensor fluid had to be found which, among others, behaves indifferent to thermal load. As Example 5 illustrates, this is not the case when tetra-alkylammonium halogenides are used as electrolyte.

It has surprisingly been found that the use of sodium iodide as electrolyte solves the above-stated object of the invention. This electrolyte is not taken into consideration at the outset, since electrolytes with metal cations possess the adverse property of reacting with possible disintegration products of the solvent (carbon dioxide) and thereby forming precipitations. However, these disadvantages are alleviated through limiting other conditions during use, and if necessary, by the addition of stabilizers. The examples below illustrate these relations. For example, precipitations occur, at a thermal load above 90° C. over a longer period of time when more than 1.5% water is added to the mixture (compare Example 4). Thus, when dibenzo-18-crown-6 (Cas is added, a precipitation of sodium carbonate can be avoided.

One of the decisive criteria for the technical application of the electrolytes described here, the is the long term stability of the electrolyte. Only slight changes in its properties are permissible to occur during transport, storage, production and application of the electrolyte.

In accordance with the invention, no change occurs in a mixture of propylene carbonate and sodium iodide, unless there are outside influences relative to conductivity, factor F, viscosity, boiling point and flash point. The materials used are thermodynamically stable under the usual marginal conditions (usual storage and processing temperature max. 25° C.).

When the fluid is used as a fluid component in resistive slope sensors in the automotive industry, it is exposed to a thermal load (up to 85° C.) as well as an electrochemical load. A further load may occur during use when substances, such as water and oxygen, diffuse into the housing if the housing is not properly sealed, thereby causing possibly chemical reactions, that occur either directly with the electrolyte, or with the electrolyte-electrode system.

Example 5, compares the thermal load capacity of various electrolytes. As is shown in 5.3, the conductivity does not change at room temperature (measurement accuracy: +/−0.5 $\mu$Scm$^{-1}$) thereby guaranteeing a storage stability. At 85/90° C. over 1500h, the conductibilty of the tetra-ethylammonium chloride/propylene carbonate mixture diminishes by 28%, while the conductivity of the NaI containing electrolyte diminishes by only 2–3%.

As example 5.5–5.9 demonstrates, the thermal stability of the NAI is also provided at 120° C. Additions to the electrolyte (compare. electrochemical stability, precipitations) have no quantifiable influence.

Any leakage in the housing may lead to the electrolyte coming into contact with water during its use and to react with propylene carbonate to produce 1,2 propanediol and carbon dioxide. Metal carbonate exhibits only little solubility in propylene carbonate. As shown in Example 4, conditions may exist which lead to formation of precipitation in the electrolyte. While no formation of precipitation could be detected under varying conditions with the use of TEtACI (4.1), however, the unsatisfactory thermal stability remains problematic.

Example 4.1–4.6 show, that when using NaI, a certain level of water concentration in the electrolyte should not be exceeded. In those cases where water uptake by the electrolyte cannot be ruled out, precipitation of sodium carbonate can be advantageously avoided by the addition of dibenzo-18-crown-6.

The fluid component according to the invention serves to conduct the alternating electrical current between the electrode system. In order to obtain a slope dependent signal that is stable over a long period of time, it is necessary, to combine the fluid component with an electrode system having long term stability. The sensor fluid-electrode system operates on the principle of measuring the resistance between two electrodes that are immersed only partially within a fluid. Thus a resistance signal with respect to the surface of the immersed part of the electrode is generated, and on the basis of this signal the location of the electrode can be determined.

The measurement of the resistance is effected by conducting an electrical current through the sensor fluid-electrode system, thus leading to a permanent electrical current load. As a basic requirement, the electrode segment, which is immersed in the sensor fluid, must not be changed by the electrical current. Likewise, no polarization layer must be allowed to build up over time, otherwise a variable signal is being measured while the slope position is steady.

In order to solve this problem, not only must electrodes be employed that fulfill these requirements, but also, the levels of electrical current and voltage that are required for measurement must be adjusted, so that a durable long-term system is effected. As a possible solution, non-polarizable electrodes, i.e. silver/silver iodide respectively, silver/silver chloride can be used. However, it cannot be ruled out, that any measuring instrument also measures portions of direct-current and there is always the danger with electrodes of this type, that changes occur in the electrode parts which are immersed within the sensor fluid, since, for example, silver halogenide is completely reducible.

Surprisingly, it has been found, that a long term stable system can be built with polarizable electrodes. Platinum has been proven to be especially suitable for use as electrode material. Likewise, platinum/iridium or ruthenium-mixed oxides are also suitable for use. It has been proven particularly advantageous to put these electrode materials onto a valve metal support, preferably onto a titanium wire, whereby advantageously, the mechanical stability of the valve metal are coupled with the electrochemical properties of the precious metal layer.

The fluid system must likewise be adjusted to the chosen electrode system. A variety of technical difficulties connected with this must be solved by the choice of fluid systems: portions of direct current may cause the formation of a basic border layer near the cathode, and an acidic border layer near the anode. In the presence of water, this can lead to a disintegration of propylene carbonate and subsequently,—when using sodium iodide as electrolyte— to a precipitation of sodium carbonate. When using tetra-ethylammonium chloride, the tetra-ethylammonium ion likewise disintegrates in the vicinity of the anode. Furthermore, when measurement currents are too high, this can generally lead to cathodic and anodic disintegration of the fluid. Thus, it is shown that the use of ammonium salts will, in no case, lead to a satisfactory, long term stable system. It is shown that the object of the invention can only be solved by adjustment of the propylene carbonate-sodium iodide system.

The danger of having an acidic or basic milieu near the electrode can be suppressed through the use of the right electrical currents and voltages. By using a masking material, e.g. di-benzo-18-krone-6, a precipitation of sodium carbonate near the cathode can be suppressed. In accordance with the invention, the problem relating to disintegration by a too high charge level per phase, can be avoided by the addition of redoxactive material, e.g. BHT (2,6 ditert-butyl4-methylphenol). With the combination according to the invention of, at least sodium iodide and propylene carbonate in contact with the electrodes as described, surprisingly, all of the marginal conditions are solved and the properties of the slope sensors with respect to the factor F remain then also constant over long periods of use.

In technical applications, this is of particular importance, where it cannot be ruled out that water is present during use, either when the assembly parts are being filled or, through leakage of the sealing materials.

Furthermore, the fluid as claimed according to the invention exhibits a series of advantages which make them seem particularly suitable for the application in electrical and electronic building parts, to wit, the flash point of the mixture as described above is very high (123° C.), the boiling point at 241–242. With the low melting point (−48° C.), a broad temperature range for applications is thus provided. Also, the point of ignition of the above described mixture is very high at 510° C.

An important advantage is also that the substance is generally recognized as ecologically and toxicologically safe for humans, the fluid being WGKO and neither toxic nor of low toxicity.

A further advantage is the low vapor pressure, thus leading to low rate leakage in sealed hollow bodies (sensors) over the duration of their use.

The electrolytes a described are characterized particularly through their steady conductivity at high temperatures over long periods of time. Furthermore, resistively functioning sensors that are operated by alternate current, require a certain tolerance against portions of direct current, which is advantageously provided with the electrolytes according to the invention.

EXAMPLES

Without limiting the general application of the invention in any way, in the following examples, a sensor fluid according to the invention with set basic conductivity of 17.5 $\mu Scm^{-1}$ at −40° C. is used.

The factor F is defined as quotient of the conductivity of electrolyte solutions at −40° C. and at 85° C.

The conductivity is determined by means of a generally available conductivity measuring instrument with a double platinum electrode (manufacturer: WTW, electrode Schott)
1. a) a mixture is prepared from 90% tri-ethyleneglycoldimethylether, 9% ethyleneglycol and 1% tetraethylammonium chloride (TEAC).
   b) a 0.05% solution of TEAC in propylene carbonate is prepared.
   c) a solution is prepared of 0.05% NaI in propylene carbonate.
2. 1% water is added to each of the solutions prepared under a)–c), resulting in solutions 2) a–c).
3. The factor F of the solution as prepared under 1) and 2) is determined

| Mixture | Factor F | Factor F |
|---------|----------|----------|
|         | Mixture Example 1 | Mixture Example 2 |
| a) | 16 | 31 |
| b) | 21 | 22 |
| c) | 21 | 22 |

| 4. Stability/Durability Tests: | | | | | |
|---|---|---|---|---|---|
| No. | % Water content | Conducting salt mixture | T/° C. | t/hr | Precip. |
| 4.1 | 1.9 | TEtACl | 90/85 | 500–1000 | no |
| 4.2 | 2.02 | NaI | 90 | 48 | yes |
| 4.3 | .25 | NaI | 90/85 | 500–1000 | no |
| 4.4 | .5 | NaI | 90/85 | 500–1000 | no |
| 4.5 | .48 | NaI | 115 | 10 | no |
|     |     |     | 40 | 288 | no |
|     |     |     | −18 | 72 | yes |
|     |     |     | 20 | 24 | yes |

| 5. Stability/Durability Tests: | | | | | | |
|---|---|---|---|---|---|---|
|     | Conducting | LF (25° C.)/ $\mu Scm^{-1}$ | | ΔLF | T/ | |
| No. | salt mixture | Start | End | ΔLF | % | ° C. | t/hr |
| 5.1 | NaI | 162 | 156 | −6 | −3.7 | 90/85 | 504 + 1080 |
| 5.2 | NaI | 166 | 162 | −4 | −2.4 | 90/85 | 456 + 1080 |
| 5.3 | NaI | 164.5 | 164.3 | −.2 | −0.1 | 20 | 4700 |
| 5.4 | TEACl | 183 | 143 | −40 | −27.9 | 90/85 | 504 + 1080 |
| 5.5 | NaI | 157 | 153.1 | −3.9 | −2.5 | 120 | 312 |
| 5.6 | NaI | 182.6 | 181 | −1.6 | −1.1 | 120 | 312 |
| 5.7 | NaI + 1 + 2 | 163.8 | 161.9 | −1.9 | −1.2 | 120 | 312 |
| 5.8 | NaI | 165 | 163.2 | −1.8 | −1.1 | 120 | 312 |
| 5.9 | NaI + 2 | 167 | 163.4 | −3.6 | −2.1 | 120 | 312 |

Supplements
1: Dibenzo-18-crown-6
2: BHT while the invention has been illustrated and described as embodied in a fluid electrode system for resistive slope sensors, it is not intended to be limited to the details shown since various modifications and structural changes may be made without departing in any way from the spirit of the present invention.

what is claimed as new and desired to be protected by letters patent is set forth in the appended claims:

What is claimed is:

1. An electrode-electrolyte slope sensor measuring slopes for use in the automotive field comprising,
   an electrode system comprising electrodes disposed within a housing,
   a conductible fluid which is a mixture of at least sodium iodide and propylene carbonate contained in said housing, the fluid providing a fluid surface, wherein a change of the fluid surface relative to the housing produces a change in a field of electrical current between the electrodes while the electrodes are immersed within the conductible fluid which produces a starting signal to be sent to a measuring unit and from which the slope is then determined.

2. The electrode-electrolyte slope sensor of claim 1, wherein the electrodes are coated with metal-mixed oxides and wherein the metal is selected from the group of platinum, iridium and ruthenium.

3. The electrode-electrolyte slope sensor of claim 1 wherein the electrodes are polarized electrodes and are selected from the group consisting of silver/silverhalide, platinum, platinum-plated valve metal, palladium and palladium-plated valve metal.

4. The electrode-electrolyte system for a slope sensor for measuring slopes comprising:

an electrode system comprising electrodes disposed within a housing, a conductible fluid which is a mixture of at least sodium iodide and propylene carbonate contained in said housing, the fluid providing a fluid surface, wherein a relative change of the level of the fluid surface, which is dependent on the placement of the electrodes within the conductible fluid, is measured as a change in a field of electrical current between the electrodes and which produces a starting signal to be sent to a measuring unit and from which the slope is then determined; and wherein dibenzo-18krone-6 or 2, 6 ditert-butyl-4-methylphenol is added to the electrolyte as a stabilizer.

5. The electrode-electrolyte slope sensor of claim 4, wherein:

the electrolyte mixture and the electrodes system of the slope sensor are stable of up to 120° C.

* * * * *